United States Patent [19]
Forin

[11] Patent Number: 5,541,732
[45] Date of Patent: Jul. 30, 1996

[54] METHOD AND APPARATUS FOR MEASURING A RELATIVE MOVEMENT BETWEEN TWO ELEMENTS

[75] Inventor: Philippe Forin, Montrouge, France

[73] Assignee: Matra Transport, Montrouge, France

[21] Appl. No.: 394,035

[22] Filed: Feb. 24, 1995

[30] Foreign Application Priority Data

Feb. 28, 1994 [FR] France .................................. 94 02261

[51] Int. Cl.$^6$ .................................. G01B 9/02; G01P 3/36
[52] U.S. Cl. ........................ 356/373; 356/28.5; 356/358
[58] Field of Search .............................. 356/373, 27, 338, 356/336, 28, 28.5, 345, 356, 358

[56] References Cited

U.S. PATENT DOCUMENTS

| | | | |
|---|---|---|---|
| 3,804,517 | 4/1974 | Meyr et al. | 356/28 |
| 3,885,873 | 5/1975 | Adermo | 356/28.5 |
| 4,162,509 | 7/1979 | Robertson | 356/28 |
| 4,312,592 | 1/1982 | Sabater et al. | 356/373 |
| 4,334,779 | 6/1982 | Domey et al. | 356/28.5 |
| 4,413,905 | 11/1983 | Holzapfel | 356/28.5 |
| 4,979,818 | 12/1990 | Kobayashi | 356/338 |

FOREIGN PATENT DOCUMENTS 3819085  12/1989  Germany.

OTHER PUBLICATIONS

Industrial Laboratory, vol. 40, No. 10, Oct. 1, '74, Moscow pp. 1453–1454—Rakhlin et al "Opticomechanical method of Measuring the Rates of Diffusion of Streams of Free-Flowing Materials"—Whole document—FIG. 1.

Primary Examiner—Hoa Q. Pham
Attorney, Agent, or Firm—Larson and Taylor

[57] ABSTRACT

For measuring an amount of relative movement between two elements, such as a vehicle and a track, which are mutually movable, two successive pulses of coherent light are directed from the vehicle to the track under a same incidence angle. From a same location of the vehicle, two images of the interference patterns due to the short pulses are formed. The two pulses are offset from each other in the direction of movement by a distance d approximately corresponding to the amount of relative movement between the two pulses. The actual amount of movement is computed as being the movement which provides the best coincidence between the two images. The comparison can be made by cross-correlation.

12 Claims, 1 Drawing Sheet

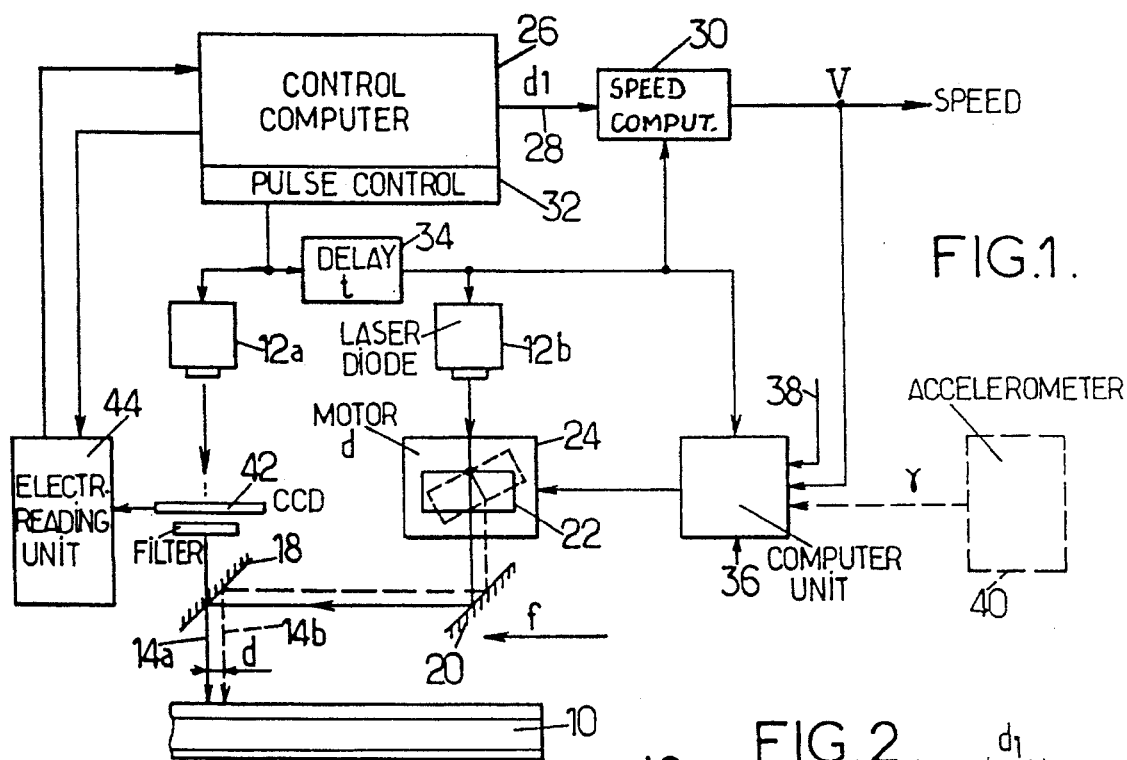
FIG.1.
FIG.2.
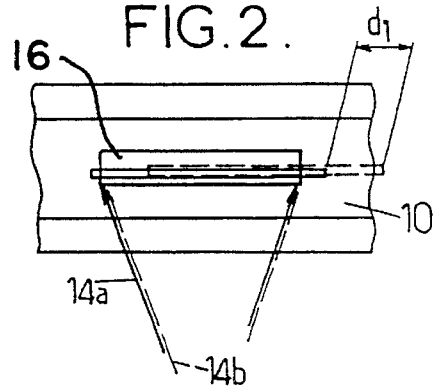
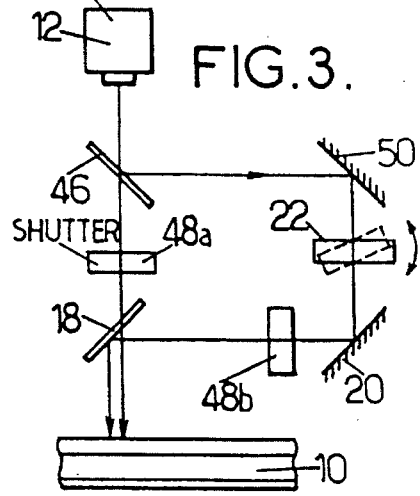
FIG.3.
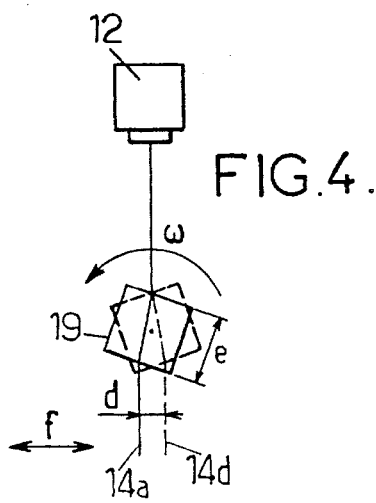
FIG.4.
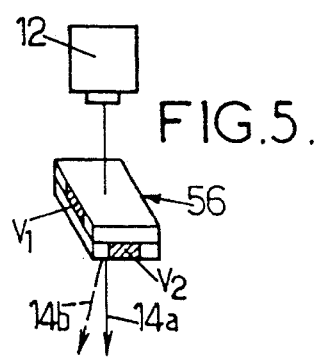
FIG.5.

METHOD AND APPARATUS FOR MEASURING A RELATIVE MOVEMENT BETWEEN TWO ELEMENTS

BACKGROUND OF THE INVENTION

The present invention relates to measuring the amount of relative movement between two mutually movable elements. The invention is suitable for use in numerous fields, particularly in the field of transportation systems wherein a vehicle (constituting the first element) moves on a guide track (constituting the second element). This application will be the main application referred to in the following, but the invention is also suitable for use in many other fields and notably in industrial installations in which an elongated product (constituting the second element) passes through an apparatus (constituting the first element), such as a rolling mill or a papermaking machine. In all these installations, there are systems for automatic control and monitoring which require measuring an amount of movement and/or a speed.

Many methods for measuring an amount of movement or speed are already known. In the railroad field, the most frequently used method consists in measuring the rotational speed of the wheels. That measuring method has a poor accuracy due to slipping. Furthermore, it requires periodical recalibration due to wheel wear. Speed measuring methods based on the Doppler effect have also been proposed, using a generator of microwaves which are back scattered by the track. That method is difficult to implement reliably and it does not give significant results at low speeds.

A measuring method has also been proposed (U.S. Pat. No. 4,162,509) including the steps of forming two successive images, each provided by a flash tube-photodiode array unit, the two units being at a fixed distance from each other; the flash tubes may be omitted if ambient light is available. A circuit adjusts the time interval between the two images so that the two images substantially correspond to the same area of the ground. A correlation between the two images that have been obtained is then made.

Last, document CH-A-531 178 discloses a method using two sources that continuously light a track with respect to which a vehicle provided with the measuring apparatus is moving. There is neither generation of an image of a common region, nor generation of an image of an interference array. The reflectivity of the lighted area is simply measured by a photoelectric converter. The output signals from the two converters are multiplied so as to obtain a cross-correlation function. As in the previously cited reference, the time delay between the samplings is adjusted. To obtain a significant result, it is essential that the time delay be very accurately adjusted responsive to the amount of movement of the vehicle relative to the track, and that represents a drawback.

SUMMARY OF THE INVENTION

An object of the invention is to provide a measuring method compatible with a high speed and providing a high degree of accuracy. For that purpose, it particularly provides a method wherein the two images are obtained by directing two successive short light pulses from the first element toward the second element, having substantially the same angle of incidence, spatially offset with respect to the first element in the direction of movement, said offset being approximately equal to the amount of relative movement that occurred between the elements between the two short light pulses.

It is sufficient that the relative speed be approximatively known for implementing the method. That knowledge may be obtained by another method, which may be less accurate and less reliable than the method of the invention. If successive measurements are repeated from the beginning of the movement, the relative speed may be derived from the amount of movement and from the time interval between the two images during a measurement and stored. Then the offset for the next measurement may be selected at a value corresponding to the amount of relative movement which would have occurred if the same speed had been maintained. It is also possible to correct the value of the amount of movement by approximately measuring the acceleration of the vehicle and computing the expected speed variation.

If the method is for measuring the speed of a vehicle on a railroad, the first element will be the vehicle and the second element will be an elongated element of the track, usually a rail.

Another object of the invention is to provide an apparatus implementing the above-described method. The device may comprise, on the first component: means for generating pulses of coherent light, means having a same position with respect to the first component for forming and storing two successive images of the second component taken at times separated by an interval which is sufficiently short for the two images to have an overlap, and means for determining, by searching a best coincidence between the two images, the amount of relative movement between the two components. The light generating means may have a source controlled for providing two short light pulses illuminating the second component, each for generating one of the images, and be provided with light deflecting means controlled for providing a spatial offset between the two positions lighting, with respect to the first component, the direction of movement, the offset being such that the two images be taken in the same conditions of illumination of the second component.

The light generating means may comprise one or more pulsed laser diodes, although a laser (particularly a YAG laser) has the advantage of being more monochromatic, but at the expense of a much higher cost. The image forming means are generally either a CCD strip (linear array) so located that its direction of elongation is parallel to the direction of movement, or a matrix array if it is desired to also measure a possible transverse movement. It will often be possible to dispense with an image forming optical system since it is simply desired to obtain an image of the intersection of a three-dimensional interference pattern with a plane (in the case of an array) or with a line (in the case of a CCD strip).

The generator means may have a wide variety of constructions; only some of them will be given hereinbelow, by way of example.

The above features and others, advantageously used in combination with the preceding ones but possibly used separately, will become more apparent from the following description of particular embodiments, given by way of examples only.

BRIEF DESCRIPTION OF THE DRAWINGS

The description refers to the accompanying drawings, wherein:

FIG. 1 is a schematic block diagram of a first embodiment;

FIG. 2 is a schematic representation showing successive steps of the measuring method; and FIG. 3, 4 and 5, similar to a portion of FIG. 1, illustrate modified embodiments.

DETAILED DESCRIPTION OF PREFERRED EMBODIMENTS

The apparatus schematically represented in FIG. 1 is for measuring the speed and/or amount of movement of a moving object consisting of a mass transportation vehicle, along a direction f represented by a rail 10. The whole apparatus is carried by the vehicle and the apparatus may be embodied in the control device of the vehicle, and will provide data regarding speed and displacement to the device.

The apparatus comprises means for generating a same interference pattern twice, by lighting a same portion of the rail twice, under the same angle of incidence, and each time during a short time period.

In the embodiment shown in FIG. 1, the means for generating two short light flashes comprise two pulsed sources 12a and 12b, which are typically laser diodes.

The two laser diodes are controlled so as to provide two successive light pulses which are separated by a time interval t. Means are provided so that a common area of the rail 10 be lighted by the two successive flashes, i.e. so that the beams 14a and 14b cover substantially the same area of the rail 10, as indicated by a rectangle 16 in FIG. 2. It is desirable that the lighted portion of the rail be approximately rectangular and be elongated in the direction of movement, so that the means forming an image of the pattern of the interference array receive a well-defined pattern.

In the embodiment of FIG. 1, the two lightings of a common area are achieved by servo-controlling the position of the light spot formed on the rail by the source 12b for it to coincide with the spot formed by the source 12a, which delivers a fixed output beam through a fixed semi-transparent mirror 18.

For that purpose the beam from the second source 12b is reflected towards the rail by a fixed mirror 20, and by the semi-transparent mirror 18 and it passes through deflecting means which can shift the beam 14b with respect to the beam 14a, by a distance d which is substantially equal to the amount of movement of the moving elements between the two flashes.

As shown in FIG. 1, the deflecting means comprise a transparent plate 22 with parallel surfaces which can be angularly adjusted by a step-by-step motor 24 or a similar actuator. When the plate is in the position shown in solid lines, the beams 14a and 14b are in registration. When it is disposed obliquely, as shown in dashes, it shifts the output beam 14b by a distance which is a function of the angular position of the plate. The maximum value that can be taken by the offset d is selected as a function of the fixed time interval between two flashes and of the maximum speed of the moving element. By way of example, laser diodes providing flashes having a duration of 50 ns may be used, this value being short enough to obtain sharp images up to about 350 km/h. The time interval between the two flashes may be of some tens of microseconds only, which corresponds to a shift d (FIG. 1) of a few millimeters at the maximum speed of 350 km/h.

The apparatus shown in FIG. 1 comprises a microprocessor based control computer 26, which controls each measuring sequence and delivers, on an output 28, the measured value d1 of the movement between two successive flashes of a same sequence. Another computing circuit 30 derives the speed from the amount of movement d1 and from the known time interval t which separates the two flashes.

The control computer 26 delivers a sequence initiating pulse to a flash control electronic circuit 32 which triggers the beam 14a, and, with a delay t, which is fixed or adjustable by means of a component 34, triggers the beam 14b. The step-by-step motor 24 of the deflecting means is driven by a computing unit 36 which derives the distance d from the delay t and from the speed and which controls the angular position of the plate 22. If measurements are repeated, the speed V inputted to the control computing 36 may be the speed value computed during the preceding sequence by the circuit 30. Upon initialization, or even during current operation, an approximate value of the speed may be provided, at an input 38, by another element, for example a sensor located on a vehicle wheel. The shift d is not involved in the computation of the speed: it must only be such that the two flashes are directed substantially to the same area of the rail, under the same angle of incidence.

The computing unit 36 may also be designed to receive a signal representing the acceleration from an accelerometer 40 and to adjust the speed measurement received from the circuit 30 responsive thereto.

In the illustrated embodiment, the means for forming two successive images that are mutually offset of a distance d1 (FIG. 2) are a strip of charge coupled sensors 42, or CCD strips. In particular, a strip comprising one thousand light sensitive sites distributed over a length of 1 cm may be used. Scattering of each light flash by the rough surface of the rail generates a 3-dimensional interference pattern. The strip will receive a light pattern constituted by the intersection of each 3-D interference pattern in turn with its light collecting surface. The strip may receive each interference pattern in turn through a colored selection filter matched to the emitting wavelength of the pulsed sources 12a and 12b. The control computer 26 receives the two successive images transmitted by the electronic read-out unit 44, and computes the travelled distance d1 by image processing. Among convenient processing methods of comparison between the two images, the cross-correlation function may be computed. That function has a peak whose abscissa represents the value d1 of the amount of movement of the train between the two flashes, with a proportionality coefficient if there is an optical system having a magnification other than 1 before the strip on the light path.

One or more additional electroluminescent diodes may be disposed between the diodes 12a and 12b; the diode 12b or the additional diode is used depending on the speed. For example, the number of diodes may be such that the delays to be generated are, for the set measurement range, from 200 μs to 2 ms.

In the modified embodiment shown in FIG. 3, where components corresponding to those already described are designated by the same reference numerals, a single pulsed source 12 is used to provide two successive flashes separated by the time interval t. The first flash lights the rail 10 through a semi-reflecting mirror 46, a first obturator 48a and the semi-transparent plate 18. The second flash follows a path including a reflection on the semi-reflecting mirror 46, a reflection on a fixed mirror 50, a travel through the angularly adjustable plate 22 with parallel surfaces, a reflection on the fixed mirror 20 and a travel through a second obturator 48b. In that case, the control computer 26 is arranged to open the obturator 48a during the first flash and to close it during the second flash, and to open the obturator 48b only during the second flash. Control of the step-by-step motor of the strip 22 may be the same as in the previous case.

In the modified embodiment shown in FIG. 4, the light generating means comprise a single pulsed source 12 of coherent light. The deflecting means comprise a plate 19 with parallel surfaces. This plate 19 may be a straight prism, with a square cross-section in the embodiment of FIG. 4. The plate 19 is continuously rotated by a motor (not shown) whose speed is selected so as to obtain the desired spatial offset $\underline{d}$, between the successive flashes. For a time interval $\Delta t$ between the two flashes, a rotational speed $\omega$ and a plate thickness e, the offset is d #e$\omega\Delta t(1-1/n)$, where n is the refraction index of the plate.

The spatial offset $\underline{d}$ can be adjusted from 0 to a few millimeters by modifying the rotation speed $\omega$ and possibly the time interval $\Delta t$ between the flashes.

A device for detecting the angular position of the plate may be provided and arranged to trigger the first flash in a predetermined position of the plate, so as to make sure that the two flashes enter the same surface rather than two mutually adjacent surfaces of the plate. That device becomes necessary if a prism with more than four sides parallel to the rotational axis is used, for example with eight sides, to deflect the output beam of the source 12.

In the modified embodiment of FIG. 5, the deflection means are acousto-optical cells; only one of these cells has been represented. By varying the frequencies of the signals V1 and V2 applied to the controlling piezoelectric material, the wavelengths of stationary ultrasonic waves in the quartz are changed and modify the diffraction lattice generated by these waves. The embodiment of FIG. 5 has the advantage of being particularly fast and of enabling "tracking", even for rapid variations of speed or a very short time t.

Other embodiments are possible. In particular, the image forming means may consist of a matrix sensor instead of a strip 42. It is then possible to determine the speed of the moving object not only in the regular moving direction f, but also transversely, and to control the position of beam 14b in all directions by adding deflecting elements.

I claim:

1. A method for measuring an amount of relative movement between a first element and a second element which are mutually movable along a predetermined direction, comprising the steps of:

(a) directing, from said first element, a first short pulse of coherent light with a predetermined incidence angle onto said second element and forming, at a predetermined location of said first element, a first image of an interference pattern due to back scattering of said first short pulse by said second element;

(b) after a predetermined time period, directing a second short pulse of said coherent light to said second element from said first element, with said predetermined incidence angle, having an offset along said predetermined direction, with respect to said first element, which is adjusted to be approximately equal to the amount of relative movement which occurred between the first and second elements during said predetermined time period; and forming, at said predetermined location of said first element, a second image of an interference pattern due to back scattering of said second short pulse by said second element; and (c) computing said amount of relative movement as being an amount of movement which provides a best coincidence between said first image and said second image, said short pulses illuminating areas of said second element having a sufficient extent for a common part of the second element to intervene in forming the two images of interference patterns.

2. Method according to claim 1, further comprising the steps of deriving a relative speed between the first and the second elements from the computed amount of movement and from the time interval between the two light pulses, storing said relative speed and selecting said offset, for a next measurement sequence, as being an offset corresponding to a relative movement which could have occurred at the derived relative speed.

3. Method according to claim 2, further comprising measuring an amount of relative acceleration between the two elements and correcting said offset responsive to the measured acceleration.

4. Method according to claim 1, wherein said offset is selected based on a previous approximate measurement of a relative speed delivered by additional speed measuring means.

5. Method according to claim 1, for measuring the speed of a vehicle constituting the first element on a railway track constituting the second element, wherein the images are those of a rail of the railway track.

6. A device for measuring an amount of relative movement between a first element and a second element movable with respect to each other in a predetermined direction, comprising, on said first element:

means for generating two successive short pulses of coherent light toward said second element with a same predetermined angle of incidence, at a predetermined time interval, deflecting means controlled to cause a spatial offset in the direction of movement between the two coherent light pulses, with respect to said first element, said offset being approximately equal to the amount of relative movement;

means having a predetermined position on said first element for forming and storing two successive images, each of one interference pattern caused by back scattering from an area of said second element illuminated by one of said two pulses, said predetermined time interval being sufficiently short for the two successive images to have an overlap; and means for determining, by searching a best coincidence between the two images, the amount of relative movement between the first element and second element.

7. Device according to claim 6, wherein said means for generating pulses of coherent light comprise a pulsed laser diode.

8. Device according to claim 6, wherein said means for generating coherent light pulses comprise a single source whose output beam traverses deflecting means consisting of a transparent plate having parallel surfaces and driven in rotation at a constant speed.

9. Device according to claim 6, wherein the means for generating coherent light pulses comprise a single source delivering an output beam and means for separating said output beam into two paths, one of which is stationary and comprises a first obturator and the other of which includes said deflection means and a second obturator.

10. Device according to claim 6, wherein the means for forming and storing two successive images comprise a CCD strip elongated in said predetermined direction of mutual movement of the first element and second element.

11. A method for measuring an amount of movement of a vehicle with respect to a guide track, comprising repeating a sequence of the following steps:

(a) directing, from said vehicle, a first short pulse of coherent light with a predetermined incidence angle onto said track and forming, at a predetermined location of said vehicle, a first image of an interference pattern due to back scattering of said first short pulse by said track;

(b) a predetermined period after said first pulse, directing a second short pulse of said coherent light toward said track from said vehicle, with said predetermined incidence angle and with an spatial offset with respect to said vehicle, in a direction of said track, approximately equal to the amount of movement of said vehicle between the two pulses; and forming, at said predetermined location of said vehicle, a second image of an interference pattern due to back scattering of said second short pulse by said track; said short pulses of light being spatially dimensioned for having a common part; and (c) computing said amount of movement as being an amount of offset between said first image and said second image which provides a best coincidence therebetween.

12. Method according to claim 11, further comprising the steps of deriving an estimated speed of the vehicle from the computed amount of movement and from the time period between the two light pulses and storing said estimated speed, wherein the spatial offset of step (b) is selected, for a next sequence, as being an offset corresponding to the amount of movement which would have occurred at said estimated speed.

* * * * *